United States Patent

[11] 3,555,197

[72] Inventors Kurt Strunk
Markgroningen;
Heinrich Halfmann, Ulrich; Klaus
Luhmann, Vaihingen, Germany

[21] Appl. No. 707,543
[22] Filed Feb. 23, 1968
[45] Patented Jan. 12, 1971
[73] Assignee International Standard Electric
Corporation
New York, N.Y.
a corporation of Delaware
[32] Priority Feb. 24, 1967
[33] Germany
[31] St26542

[54] GUIDE-WIRE ROUTE SEARCHING NETWORK
11 Claims, 2 Drawing Figs.

[52] U.S. Cl. .......... 179/18
[51] Int. Cl. .......... H04q 3/49
[50] Field of Search .......... 179/18.211, 18.7Y

[56] References Cited
UNITED STATES PATENTS 3,310,633 3/1967 Schonemeyer .......... 179/18(.7Y)

*Primary Examiner*—Kathleen H. Claffy
*Assistant Examiner*—Thomas W. Brown
*Attorneys*—C. Cornell Remsen, Jr., Rayson P. Morris, Percy P. Lantzy, J. Warren Whitesel and Delbert P. Warner

ABSTRACT: A route search may be completed through a switching network using a guide-wire or pilot network. The search is performed using only a single polarity feeder voltage and ground potential as a reference. A voltage divider is included in each guide-wire which can be influenced by the offering signal on the offering end of the guide-wire so that a first voltage value appears on the guide-wire to actuate an offering amplifier on the end. The actuated offering amplifier provides an access potential on the guide-wire carrying the offering potential. The access potential on a guide-wire carrying the offering potential affects the voltage divider on the access end so that a second, higher voltage value of the same polarity appears on the said guide-wire if the said offering amplifier in the access end represents a further guide-wire which is in the idle condition. An indicator connected at the offering end responds to the higher voltage value of the same polarity to effect the connection of the actual network on the corresponding switches and links.

GUIDE-WIRE ROUTE SEARCHING NETWORK

Figure 1:
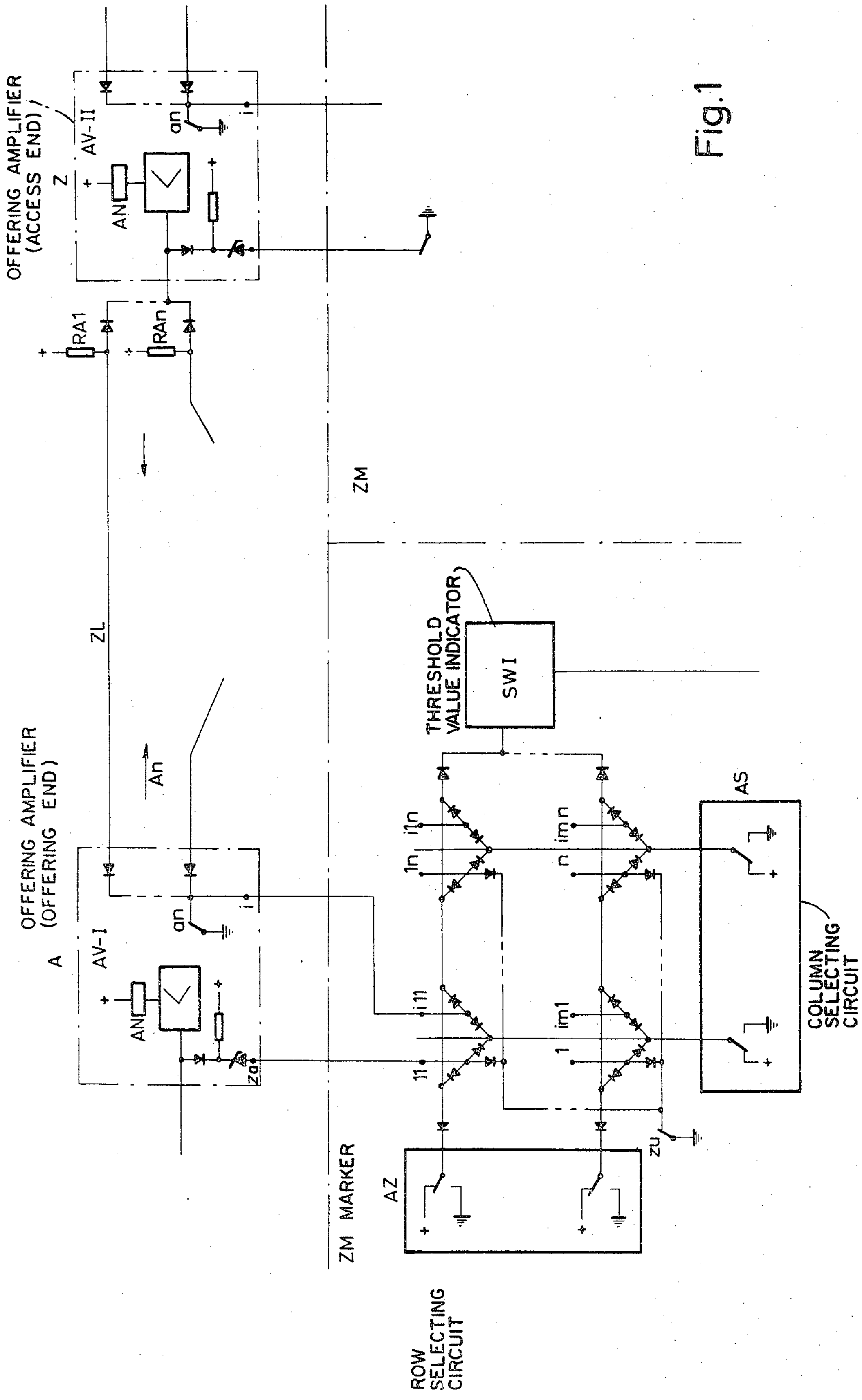

The invention relates to circuit arrangements for route searching through multistage networks using an equivalent guide wire network and offering amplifiers. In one direction the idle, possible route sections are marked with offering signals. In the opposite direction the selection of an idle route section is initiated with an access signal.

There are various arrangements known for route search via a network which provides two potentials of different polarity for the offering signal (demand-for-service signal) and for the access signal. In these arrangements such control potentials require decoupling elements at the guide wire and, moreover, two mutually independent feeder voltage sources.

Reference may be had to U.S. Pat. 3,310,633, issued to Schonemeyer on March 21, 1967 (and assigned to the assignee of the present invention) for a general understanding of an earlier version of a guide-wire controlled switching network. The present invention constitutes an improvement over the Schonemeyer system by utilizing a single guide-wire in place of the two shown by Schonemeyer. In the patent referred to, the basic switching matrix to which the new system is applied is essentially comparable.

The telephone exchange systems of the conventional type are frequently equipped with one feeder voltage source only. Therefore it is desirable also in new systems with switching networks using an equivalent guide wire network for route searching to carry out such a route search with one potential only. If however two or several independent potentials of different polarity are available the guide wire could be used for signalling, besides the route search.

One known guide-wire system using one potential on the guide wire network selects route sections by blocking off the offering signal. This is performed in the simplest way in that at first all offering amplifiers of a switching stage are blocked and then opened in a timely sequence until the offering signal indicator responds again. Due to the position of the chain circuit the identity of the selected guide-wire is determined. In large, multistage switching networks this method however is of disadvantage because the selection of a guide wire per switching stage in a timely sequence requires too much time and precludes parallel selection.

It is the object of the present invention to provide a circuit arrangement for the route search in a multistage, switching network using a single-wire, equivalent guide-wire network with offering amplifiers. In one direction the idle, possible route sections are marked and, in the opposite direction, the selection of an idle route is initiated with an access signal. Thus for route searching only one feeder voltage is required. Also, parallel selection is possible. The circuit arrangement for such a switching network according to the invention is characterized in this that each guide-wire is included in a voltage divider which can be changed by the offering signal on the offering end. On the guide-wire a first voltage value appears to actuate the offering amplifier on the access end and, by the access potential on a guide-wire carrying offering potential, the voltage divider is influenced on the access end so that a second, higher voltage value of same polarity appears on the guide-wire. An indicator, connected at the offering end, responds. For the route search only one voltage source is required and the advantages of a method with offering and access signal are maintained. The access signals can also be evaluated in this system in parallel.

The guide-wire is connected in the new arrangement through a high resistance value to the feeder voltage. The offering amplifier of the access end reduces, by its low-ohmic input resistance, the feeder voltage to a first value which is sufficient to actuate the offering amplifier. This control voltage cannot become effective in the nonoperative condition or in the busy condition, because said voltage is short-circuited on the offering end or is reduced below the responding value of the offering amplifier.

The route search on the guide-wire network can therefore be performed with one polarity of the feeder voltage.

If a feeder voltage of another polarity is available an additional signalling in the other polarity can be made via the guide-wire network. With the arrangement according to the invention it is thus possible to provide additional signalling on the guide wires.

Figure 2:
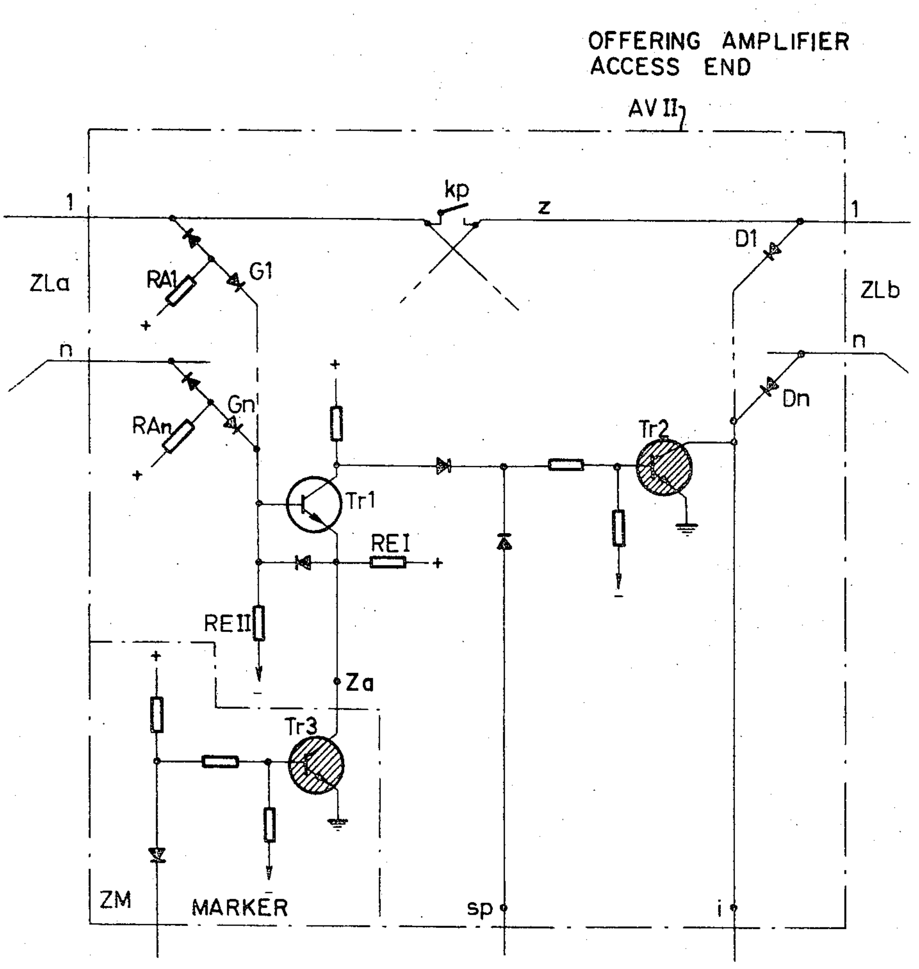

The above-mentioned and other objects and features of this invention together with the manner of obtaining them will become more apparent, and the invention itself will be best understood by making reference to the following description of an exemplary embodiment of the invention taken in conjunction with the accompanying drawings, wherein:

FIG. 1 shows a circuit arrangement with the facilities to transmit offering and access signals via the guide-wire of a switching network, and FIG. 2 shows an example of an offering amplifier for the arrangement according to FIG. 1.

In the switching network according to FIG. 1 it is assumed that a link ZL is provided between the switching multiples of different switching stages. This link ZL is represented by the guide-wire *z* to which are associated the offering amplifiers AV-I and AV-II, corresponding to the switching multiples. The guide-wires starting from the offering amplifier AV-I and leading to the switching multiples, i.e. offering amplifiers AV-II of the following switching stage, are concentrated via decoupling elements.

Each guide wire ZL comprises a voltage divider, formed by the high-ohmic supply resistors RA1 to RA*h* and the low-ohmic input resistances of the offering amplifiers, e.g. AV-II and which voltage divider can be influenced at the offering end A as well as at the access end Z. The positive feeder voltage is constantly applied.

The offering and access signal is now transmitted so that, when the offering signal arrives from the preceding switching stage, the offering amplifier AV-I on the offering end A responds. The reference potential ground is disconnected at the outgoing guide wires ZL via the switching means AN and its contact *an*. Because in this switching position only the positive potential can reach the guide-wire ZL via the scanning matrix the potential will increase in the positive direction on this guide-wire which increase is determined by the resistor RA1 and the input resistance of the offering amplifier AV-II. This voltage increase on the guide-wire ZL is sufficient to cause the offering amplifier AV-II to respond. The same switching processes are repeated on the links following the access end Z.

The input resistance of the offering amplifiers can be increased via the associated marker ZM or disconnected from the guide-wire ZL as indicated by the access contact *zu* on the access end Z. If this contact opens during the access the potential on the guide-wire ZL rises again. Thereby the threshold value indicator SWI of the offering end A responds.

In order to ease the selection of a route section in a switching stage the guide-wires coming from an offering amplifier, e.g. AV-I, are led to a common indication point *i*11 to *imn*, if the switching stage *m* comprises *n* offering amplifiers and thus switching multiples. The indication point carrying an access signal is identified via a selecting matrix. Each indication point is connected via an AND-circuit with the corresponding row and column of the selecting matrix, corresponding to its ordinal number. The row and column selecting circuits AZ and AS at first carry the positive potential so that the processes on the guide-wires ZL are not impaired by the selecting matrix.

All rows of the selecting matrix are connected with the threshold value indicator SWI via decoupling elements. This indicator only responds, if an increased potential appears via a guide-wire as an access signal. This potential can appear only if the offering signal is at hand, i.e. the contact *an* on the offering end A is open, and if on the access end Z an access signal is applied, i.e. the contact *zu* disconnects ground from the offering amplifier of the access end. The response of the threshold value indicator SWI indicates that in the switching stage an outgoing guide-wire carries an access signal and an incoming guide-wire carries an offering potential and thus, that the present connection request can be established. Selection of the switching multiple is initiated via the threshold value indicator SWI in which switching multiple these conditions are met. Selection is made via the row and column selecting circuits AZ and AS. All rows receive, at the commencement of the selection, ground potential as reference potential so that all AND-circuits which are connected to the indication points *i* 11 to *imn* of the switching stage are blocked. Because no access signal can reach the threshold value indicator SWI, the indicator SWI does not respond. A link ZL is selected when the rows are connected to the positive feeder voltage individually and successively. Then if the threshold value indicator SWI responds it means that among the offering amplifiers AV-I, associated to said row, one can be selected for the connection. Thereupon the columns for the determined row are blocked via the column selecting circuit AS using the reference potential ground. The threshold value indicator SWI drops. In the same way the columns are released successively for selection by again applying the positive potential. If the threshold value indicator SWI responds again the switching multiple and, consequently, the guide-wires for the connection are established by the position of the row and of the column selecting circuits AZ and AS. In the switching stage the access signal can now be applied to the preceding switching stage. This access is made again selectively and is also controlled via the selecting matrix. Access points *zu*11 to *zumn* (not shown) of the offering amplifiers are connected with the selecting matrix in the same way as the indication points *i*11 to *imn*, via AND-circuits. Moreover, these access points are combined via decoupling elements and led across the access contact *zu*.

If the offering amplifier to be seized is identified via the row and column selecting circuit AZ and AS the threshold value indicator SWI responds again and causes the access in the marker ZM or in a higher ranking control device to respond. Thereby, contact *zu* is opened and only the offering amplifier AV-I is switched off via the selecting matrix, which offering amplifier is marked by the position of the row and column selecting circuit AZ and AS. All other offering amplifiers of the switching stage remain connected as before with the guide-wires and offering amplifiers via the AND-circuits which carry reference potential ground at the row or at the column.

FIG. 2 shows an example of an offering amplifier. The access point *za* as well as the terminating guide-wires ZL*a*1 to ZL*an* carry the reference potential ground in the nonoperative condition. The positive potential applied to the voltage divider resistance RA1 to RA*n* cannot reach the control input of the transistor T*r*1. The decoupling elements G1 to G*n* are conductive, too. The voltage divider in the control circuit of the transistor T*r*2 is designed so that the transistor T*r*2 remains conductive in the nonoperative condition thus, the reference potential ground is applied to the outgoing guide-wires ZL*b*1 to ZL*bn* which are concentrated via the decoupling elements D1 to D*n* and terminate in the indication point *i*.

If in the preceding switching stage the reference ground potential is removed from the guide-wire ZL*a*1 then the transistor T*r*1 is fully operative via the diode G1. The control potential in the control circuit of transistor T*r*2 is changed in such a way that the transistor T*r*2 becomes nonconductive thus forwarding the offering signal to the following switching stage.

If the shown offering amplifier is selected, the reference potential ground is removed at the access point *za*, as indicated by the transistor T*r*3 in the marker ZM. Thereby the potential at the voltage divider REI, REII is shifted so that the diode G1 is blocked and the positive potential extends through to the offering end via the resistor RA1 and via the guide-wire decoupling element. At the same time the transistor T*r*1 becomes nonconductive when the reference potential is removed.

All offering amplifiers which should not participate in the selection can be blocked via the blocking point *sp*.

While the principles of the invention have been described above in connection with specific apparatus and applications it is to be understood that this description is made only by way of the example and not as a limitation on the scope of the invention.

We claim:

1. A circuit arrangement for conducting a route search in a multistage switching network using a guide-wire network equivalent to said network and having "n" switching multiples in at least one stage, said guide-wire network including an offering amplifier at the input end of said one stage of the network, said offering amplifier interconnected by a plurality of guide-wires to simulate switching multiples and connecting links, means in the offering amplifier for marking said plurality of guide-wires corresponding to idle possible route sections in a first direction with an offering signal, a plurality of offering amplifiers having access to the next successive stage of said guide-wire network, means in said last-mentioned amplifiers for marking said guide-wires corresponding to accessible routes in an opposite direction with an access signal, a voltage source, voltage divider means coupling each of said guide-wires to said source, means for varying the resistance of the voltage divider means responsive to an offering signal appearing at the offering end of a particular guide-wire, means associated with each of said guide-wires for forwarding a first voltage of predetermined value responsive to the variance of resistance of the voltage divider caused by the offering signal to actuate a particular offering amplifier at the access end of said guide-wires, means responsive to the offering amplifier at the access end of said guide-wires, means responsive to the offering amplifier at the access end being available for further varying the resistance of its voltage divider at the access end to provide a voltage of higher value of the same polarity, and means connected to the offering amplifier at the offering end operated responsive to the higher voltage to switch through the corresponding parts of the actual network.

2. The circuit arrangement according to claim 1, wherein there are provided high-ohmic resistance means for coupling all said guide-wires to said voltage source, means at the offering amplifier of the access end for reducing the voltage on a guide-wire required by said access end offering amplifier, means in the amplifiers operated responsive to said reduced voltage for applying a ground potential to said guide-wire to indicate that the corresponding switching network components are busy, and wherein there are means responsive to said offering signal for removing ground potential from the guide-wires at the offering end amplifier.

3. The circuit arrangement according to claim 2, wherein means are provided for applying an access signal to said guide-wires, said means for applying comprising means for increasing the input resistance of the offering amplifier at the access end, and for disconnecting ground from the offering amplifier at the access end from said one guide-wire to thereby provide said access signal.

4. The circuit arrangement according to claim 3, wherein means are provided for access-end amplifier actuating voltage on said guide-wire to be determined by the magnitude of the resistance at the guide-wire and by the magnitude of the input resistance of the offering amplifier.

5. The circuit arrangement according to claim 4, wherein means are provided for concentrating the guide-wires of each switching multiple, said concentration of said guide-wires terminating at an indication point at the offering amplifiers of the offering end, and said means for concentrating said guide-wires including decoupling elements.

6. The circuit arrangement according to claim 5, wherein the indication points of all the offering amplifiers of a switching stage are connected to a selecting matrix, connection to said matrix being accomplished in rows and columns and through AND circuits.

7. The circuit arrangement according to claim 6, wherein selecting circuit means are provided for connecting to said voltage source all of said indication points when said points are in the nonoperative condition and when offering and access signals are applied in the opposite direction, and for connecting to the same voltage source the respective guide-wires, said selecting circuit means including row selectors and column selectors.

8. The circuit arrangement according to claim 7, wherein second decoupling elements are provided for connecting all of said rows to a threshold value indicator, said threshold value indicator responding to the actuating voltage of the guide-wire to indicate when an offering and an access potential are combined on said guide-wire.

9. The circuit arrangement according to claim 8, wherein means are provided for applying reference voltage to the rows and columns of the selecting matrix, with said selecting circuit means comprising means for applying the actuating voltage to indicate the selection of a particular row and column.

10. The circuit arrangement according to claim 9, wherein means are provided for extending the actuating voltage of a guide-wire through an AND circuit to the said threshold value indicator responsive to the row and column of the selecting matrix associated to the guide-wires having the same voltage.

11. The circuit arrangement according to claim 10, wherein individual access points are provided at the input end of the offering amplifiers for connecting ground potential for controlling switching elements in said offering amplifiers.